United States Patent [19]

McKay et al.

[11] Patent Number: 5,150,836
[45] Date of Patent: Sep. 29, 1992

[54] METHOD OF FUEL INJECTION

[75] Inventors: Michael L. McKay, Willeton; Ian R. Thompson, Duncraig; Ralph T. Sarich, Karrinyup, all of Australia

[73] Assignee: Orbital Engine Company Proprietary Limited, Western Australia, Australia

[21] Appl. No.: 711,726

[22] Filed: Jun. 10, 1991

Related U.S. Application Data

[60] Continuation of Ser. No. 526,734, May 22, 1990, abandoned, which is a division of Ser. No. 377,742, Jul. 10, 1989, Pat. No. 4,945,886, which is a continuation of Ser. No. 16,115, Feb. 18, 1987, abandoned, which is a continuation-in-part of Ser. No. 694,311, Jan. 24, 1985, abandoned, and a continuation-in-part of Ser. No. 908,963, Sep. 18, 1986, abandoned, which is a continuation-in-part of Ser. No. 454,657, Dec. 30, 1982, abandoned.

[30] Foreign Application Priority Data

Dec. 31, 1981 [AU] Australia .................. PF2124
Aug. 31, 1984 [AU] Australia .................. PG6875

[51] Int. Cl.⁵ .................................. F02M 61/02
[52] U.S. Cl. ................................... 239/5; 239/88; 239/99; 239/411; 239/590
[58] Field of Search ............. 239/5, 88, 89, 91, 95, 239/99, 101, 102.1, 407, 411, 412, 414, 415, 590; 417/145; 222/636

[56] References Cited

U.S. PATENT DOCUMENTS

| | | | |
|---|---|---|---|
| 1,079,578 | 11/1913 | Peterson | 239/95 X |
| 3,161,144 | 12/1964 | Hugentobler | 417/145 X |
| 4,462,760 | 7/1984 | Sarich et al. | 417/145 X |

FOREIGN PATENT DOCUMENTS

| | | | |
|---|---|---|---|
| 655286 | 12/1937 | Fed. Rep. of Germany | 239/590 |
| 833736 | 7/1949 | Fed. Rep. of Germany | . |
| 896738 | 7/1949 | Fed. Rep. of Germany | . |
| 1930629 | 9/1970 | Fed. Rep. of Germany | . |
| A-2 023226 | 12/1979 | United Kingdom | . |

Primary Examiner—Andres Kashnikow
Assistant Examiner—William Grant
Attorney, Agent, or Firm—Nikaido, Marmelstein, Murray & Oram

[57] ABSTRACT

A method of injecting liquid fuel to an engine which includes delivering a quantity of fuel into a conduit and propelling the fuel along the conduit by a pulse of gas under sufficient pressure to discharge the fuel from an open nozzle into an engine induction passage, or combustion chamber. The pressure and quantity of gas are preferably sufficient to cause the fuel to issue from the nozzle at or near sonic speed. The duration of the pulse of gas may be varied with a variation in the quantity of fuel to improve the fuel metering accuracy with engine load changes.

17 Claims, 7 Drawing Sheets

METHOD OF FUEL INJECTION

CROSS REFERENCE TO RELATED APPLICATIONS

This application is a continuation of application Ser. No. 526,734, filed May 22, 1990, now abandoned, which was a division of application Ser. No. 377,742, filed Jul. 10, 1989, now U.S. Pat. No. 4,945,886, which application was a continuation of Ser. No. 016,115, filed Feb. 18, 1987, now abandoned, which application was a continuation-in-part of Ser. No. 694,311, filed Jan. 24, 1985, now abandoned, and a continuation-in-part of Ser. No. 908,963, filed Sept. 18, 1986, now abandoned, which application was a continuation of Ser. No. 454,657, filed Dec. 30, 1982, now abandoned.

THE BACKGROUND OF THE INVENTION

This invention relates to the delivery of measured quantities of liquid fuel into the induction passage of an internal combustion engine.

The various fuel injection systems currently in use, in internal combustion engines, operate on the basis of a column of liquid between the point of application of the injection force to the fuel and the delivery nozzle. These systems rely on the adding of a metered quantity of fuel to the upstream end of the column to displace an equal quantity of fuel from the nozzle at the downstream end of the column. In order to achieve the required accuracy in the quantity of fuel delivered from the nozzle, the column of fuel must be free of gas, due to its compressible nature.

It is also necessary for the nozzle to be selectively opened and closed to maintain the gas-free state of the column of fuel between successive deliveries, or to ensure sufficient delivery pressure for continuous systems, to maintain the gas-free state of the fuel line.

These selectively openable nozzles are required to be high precision components in order to maintain metering integrity and/or consistent spray characteristics. Hence, manufacturing cost is high and susceptibility to fouling by foreign materials in the fuel is prevalent. Additionally durability is a potential problem due to the frequency of opening of the nozzle for either a pulsed or continuous metering system. (In the latter case, the natural vibrational frequency of a spring-loaded nozzle is excited even though output is nominally continuous.)

U.K. Patent No. 2,023,226 involves continuous injection of a fuel/air mixture into the inlet manifold of an internal combustion engine. Compressed air and fuel are delivered separately to a mixing chamber immediately adjacent the injection nozzle, and the pressure in the mixing chamber actuates the valve in the nozzle to effect injection of the fuel/air mixture to the engine. The mixing chamber in the nozzle incorporates a porous sintered element, but it is believed this feature does not contribute significantly to proper atomization of the fuel. The required atomization is apparently achieved by the pressure drop through the valve, and the consequent sonic velocity. This injection system does not employ a constantly open injection nozzle, nor is the fuel conveyed to the nozzle by individual shots of air.

German Patent No. 314,252 employs a constantly open nozzle and high pressure air to effect injection of fuel through the nozzle. A fuel dispensing surface (grid) is provided between a fuel storage chamber and the delivery nozzle, to assist atomization of the fuel. The disclosure relates to injectors for diesel engines, and it is not disclosed that the high pressure air contributes to atomization of the fuel.

Australian Patent No. 237,354 discloses an injection system wherein a constant supply of fuel is delivered to a constantly open nozzle as a continuous flow. There is no air associated with the conveying of the fuel to the respective nozzles, or the delivery of the fuel from these nozzles.

SUMMARY OF THE INVENTION

It is therefore the object of the present invention to provide a method of injecting metered quantities of fuel into an engine induction passage, that at least, reduces the above referred to problems in currently known methods.

With this object in view there is provided a method of delivering liquid fuel to an internal combustion engine comprising delivering a pre-determined quantity of liquid fuel into a conduit, admitting a gas to the conduit upstream of the quantity of fuel at a pressure and for a period sufficient to propel the quantity of fuel through the conduit and discharge the fuel through a fixed size constantly open nozzle at the downstream end of the conduit.

Accordingly, by this method each measured quantity of fuel is transported through the conduit and delivered from the nozzle independently, avoiding the necessity of maintaining the conduit full of fuel and free of gas, as required in the currently used systems.

It has been found that if the gas pressure and nozzle design is selected so the air issues therefrom at or near sonic speed, a high degree of atomization of the fuel can be achieved.

Preferably the conduit is selected so that the frictional drag between the fuel and the internal surface of the conduit will result in at least a portion of the fuel forming an emulsion with the propelling gas, during passage through the conduit. This emulsion is characterized by a high surface area to volume ratio.

The motion of the liquid fuel through the conduit will be resisted by shear stresses at the conduit walls, and under the action of these stresses, the inner core of liquid fuel will progress faster than that fuel at the walls. The velocity of the gas being faster than the liquid fuel at the walls creates shear stresses over the liquid surface, breaking off droplets and entraining them in the gas flow creating the mixture of gas and liquid fuel.

The variables of gas pressure, conduit length and conduit diameter may be varied within respective ranges to achieve the desired mixing of the fuel and air. However, the provision of a minimum gas dose relative to the quantity of fuel makes the determination of conduit diameter, one of ensuring the smallest diameter which will pass the gas and fuel in the time available. In this way the maximum surface to volume ratio is obtained and hence maximum break-up of droplets. Empirical tests define a satisfactory minimum gas dose.

Preferably the nozzle is of a construction that creates a film of fuel immediately prior to discharge from the nozzle, at least in the lower portion of the range of discharge rates encountered during operation, that is then broken up into fine droplets prior to issuing from the nozzle. The breaking up is largely achieved by the movement of the propelling gas past a surface in the nozzle, which surface is in use, wetted by a film of fuel. This may be effected by providing, in the path of the fuel, a surface that diverges in the direction of movement of the fuel through the nozzle. Conveniently, the surface is generally conical and leads to an annular discharge port in the nozzle.

The creating of the film of fuel has the effect of increasing the surface area of fuel in contact with the propelling gas to assist atomization. When handling quantities of fuel in the lower portion of the nozzle range, the film of fuel will not fully occupy the passage through the nozzle and therefore portion of the propelling gas will flow over the exposed surface of the fuel film. The shear stresses created on the surface of the film will break off droplets of fuel to further promote atomization of the fuel.

The fuel film is created by virtue of the change of direction of movement of the fuel by the presence of the divergent surface, which for convenience is frusto-conical and terminates in an annular delivery opening. The fuel with its implicit inertia will impinge on the cone surface and will spread thereover by virtue of its tendency to continue to travel in its initial trajectory before meeting the surface.

As a guide to the surface area to be provided on the cone, the area is normally made sufficient to allow approximately half of the normal fuel pulse dose to be resident thereon, assuming a film thickness equal to the width of the annular delivery opening. The final design may be empirically determined to optimise the nozzle shape.

DETAILED DESCRIPTION OF THE INVENTION

The invention will now be described in greater detail with reference to the accompanying drawings, in which:

FIG. 1 is a sectional view of one embodiment of injection nozzle constructed in accordance with the invention;

FIG. 2 is a cross-sectional view of the nozzle of FIG. 1 taken along line 2—2;

FIG. 3 is a sectional view of another embodiment of the nozzle of the invention.

FIG. 4 is a plan view of the metering apparatus applicable to a six cylinder engine and described in applicant's co-pending U.S. Pat. No. 4554945 based on Australian Patent Application No. PF 2123/81;

FIG. 5 is a sectional view of the metering apparatus of FIG. 4, taken along the line 5—5 in FIG. 4;

FIG. 6 is an enlarged longitudinal sectional view of the metering rod of the metering apparatus shown in FIG. 5; and FIG. 7 is a sectional view of the apparatus along line 7—7 in FIG. 4.

FIG. 1 shows one design of a nozzle having a frusto-conical film forming surface and an annular delivery opening. The nozzle body 5 is adapted at one end 6 to be coupled to a flexible fuel line. At the other end the body has an internal tapered bore 7 communicating with the passage 8 extending from the one end 6 of the body. The deflector member 9 is mounted in the bore 7 and has an external tapered surface 10. The angle of the tapered bore 7 is less than the angle of the surface 10 so that the annular passage 11 formed therebetween is tapered towards the annular delivery opening 12.

In one specific construction of the nozzle the taper of the bore 7 is 6° and the taper of the external surface 10 is 8°. The width of the annular opening is in the range of 0.1 to 0.15 mm at the exit. The axial length of the annular passage formed between the tapered surfaces is 10 to 12 mm.

As can be seen in FIG. 2, a section view along the line 2—2 in FIG. 1, the shank 4 of the deflector member 9 is received in a central bore 3 with four bores 2 spaced thereabout to provide paths for the flow of fuel and gas to the nozzle. The bores 2 intersect the central bore 3 and the shank 4 is a press fit with the lands formed by the intersecting bores 2 and 3.

In an alternate construction as shown in FIG. 3, the nozzle has a parallel bore 15 of approximately 1.5 mm diameter and 1.0 to 2.0 mm long. This bore opens at the forward end into a co-axial expansion chamber 16 of a diameter of 6.0 mm and a length of 5.0 mm. The face 17 of the chamber through which the bore enters is in a plane at right angles to the bore and chamber axis. The high rate of expansion produced by the high velocity air and fuel issuing from the bore 15 into the chamber, produces fine atomization of the fuel.

In use it has been found that each of the nozzles illustrated achieve improved atomization if the gas speed at the exit from the annular opening 11 (FIG. 1) or bore 15 (FIG. 3) is sonic or of that order. This speed can be achieved if the pressure drop across the nozzle opening is of 1 BAR or more.

The measured quantity of fuel may be measured and delivered into the conduit for delivery to either of the nozzles shown in FIGS. 1 and 3, by the metering apparatus disclosed in the applicant's U.S. Pat. No. 4,554,945, the disclosure in which is hereby incorporated herein by reference, and hereinafter described with reference to FIGS. 4 to 7 of the accompanying drawings.

The metering apparatus comprises a body 110, having incorporated therein six individual metering units 111 arranged in side by side parallel relationship. The nipples 112 and 113 are adapted for connection to a fuel supply line and a fuel return line respectively, and communicate with respective fuel supply and return galleries 60 and 70 provided within the block 110 for the supply and return of fuel from each of the metering units 111. Each metering unit 111 is provided with an individual fuel delivery nipple 114 to which a line may be connected to communicate the metering unit with the injection nozzle.

FIG. 5 shows the metering rod 115 extending into the air supply chamber 119 and metering chamber 120. Each of the six metering rods 115 pass through the common leakage collection chamber 116 which is formed by a cavity 116 provided in the body 110 and the coverplate 121 attached in sealted relation to the body 110. The function and operation of the leakage collection chamber is no part of this invention and is described in greater detail in U.S. Pat. No. 4,554,945.

Each metering rod 115 is hollow and is axially slidable in the body 110 and the extent of projection of the metering rod into the metering chamber 120 may be varied to adjust the quantity of fuel displacable from the metering chamber. The valve 143 is at that end of the metering rod located in the metering chamber, is supported on the rod 143*a* and is normally held closed by the spring 145, located between the upper end of the hollow rod 115 and valve rod 143*a*, to prevent the flow of air through the hollow bore of the metering rod 115 from the air supply chamber 119 to the metering chamber 120. Upon the pressure in the chamber 119 rising to a predetermined value the valve 143 is opened so air will flow from chamber 119 to the metering chamber through hollow rod 115, and thus displace the fuel therefrom. The quantity of fuel displaced by the air is the fuel located in the chamber 120 between the point of entry of the air to the chamber, and the point of discharge of the fuel from the chamber, that is the quantity of fuel between the air admission valve 143 and the delivery valve 109.

Each of the metering rods 115 are coupled to the crosshead 161, and the crosshead is coupled to the actuator rod 160 which is slidably supported in the body 110. The actuator rod 160 is coupled to the motor 169, which is controlled in response to the engine fuel demand, to adjust the extent of projection of the metering rods into the metering chambers 120, and hence the position of the air admission valve 143 so the metered quantity of fuel delivered by the admission of the air is in accordance with the fuel demand.

The fuel delivery nipples each incorporate a pressure actuated delivery valve 109 which opens in response to the pressure in the metering chamber 120 when the air is admitted thereto from the air supply chamber 119. Upon the air entering the metering chamber through the valve 143 the delivery valve 109 also opens and the air will move towards the delivery valve displacing the fuel from the metering chamber through the delivery valve. The valve 143 is maintained open until sufficient air has been supplied to displace the fuel between the valve 143 and 109 from the chamber along the delivery line 108 and through the nozzle 18, which is preferably a nozzle as described with reference to FIGS. 1 and 2 or 3.

Each metering chamber 120 has a respective fuel inlet port 125 and a fuel outlet port 126 controlled by respective valves 127 and 128 to permit circulation of fuel from the inlet gallery 60 through the chamber 120 to the outlet gallery 70. Each of the valves 127 and 128 are connected to the respective diaphragms 129 and 130. The valves 127 and 128 are spring-loaded to an open position, and are closed in response to the application of air under pressure to the respective diaphragms 129 and 130 via the diaphragm cavities 131 and 132. Each of the diaphragm cavities are in constant communication with the air conduit 133, and the conduit 133 is also in constant communication with the air supply chamber 119 by the conduit 135. Thus, when air under pressure is admitted to the air supply chamber 119 and hence to the metering chamber 120 to effect delivery of fuel, the air also acts on the diaphragms 129 and 130 to cause the valves 127 and 128 to close the fuel inlet and outlet ports 125 and 126.

The control of the supply of air to the chamber 119 through conduit 135 to the diaphragm cavities 131 and 132 through conduit 133 is controlled in time relation with the cycling of the engine therefor the solenoid operated valve 150. The common air supply conduit 151, connected to a compressed air supply via nipple 153, runs through the body with respective branches 152 providing air to the solenoid valve of each metering unit.

Normally the spherical valve element 159 is positioned by the springs 160 to prevent the flow of air from conduit 151 to conduit 135. When the solenoid is energised the force of the springs 160 is released from the valve element 159 which is displaced by the pressure of the air supply so air will flow from conduit 151 to conduit 135 and 133.

The operation of the solenoid valve 150 may also be controlled to vary the duration of the period that air is supplied to the air chamber 119 and cavities 131 and 132, to ensure the fuel displaced from the metering chamber is delivered through the nozzle 18.

The admission of the air to the metering chamber may be controlled by an electronic processor, activated by signals from the engine that sense the fuel demand of the engine. The processor may be programmed to vary the frequency and duration of admission of the air to the metering chamber.

Full details of the operation of the metering apparatus can be obtained from applicants U.S. Pat. No. 4,554,945 previously referred to herein.

The quantity of air used to propel each measured quantity of fuel is conveniently the same for all quantities of fuel within the range required for a particular engine. The use of a constant quantity of air simplifies the construction of the metering apparatus and the control equipment used therewith.

In applying the present invention to a four cylinder 1600 cc capacity engine 4,000 mm$^3$ of air measured at S.T.P. per metered pulse to each cylinder is used throughout the full range of fuel supply which ranges from 4 to 80 mm$^3$ per metered pulse. These volumes correspond to a 4 mg of air with 3 to 60 mg of fuel per injection. Under normal operating conditions, the amount of fuel may range from 5 to 30 mg per injection. It is considered preferable for the volumetric ratio of gas to fuel (volume at S.T.P.) be at least 50 to 1. If the ratio is significantly less than 50:1 it has been found that there is a delay in the response of the engine to changes in the metered quantity of fuel delivered.

It is believed that a high ratio of air to fuel reduces the amount of fuel that is left as a residue on the conduit and nozzle walls. The greater the amount of air passing through the conduit after each metered quantity of fuel, the less is the amount of fuel remaining on the wall of the conduit.

It is also believed that fuel stripped from the wall of the conduit by the continuing flow of air, after the delivery of the main portion of the fuel, is more finely atomized and thus improved combustion efficiency.

It is therefore advantageous to use a volumetric air to fuel ratio substantially greater than 50:1, and, from a performance point of view only, it would be preferable to increase the ratio of air to fuel. This can be achieved by the use of suitable control equipment that varies the period that air is admitted to the conduit as the fuel quantities increase. Also it is desirable to increase the period that air is admitted during the starting of the engine because of the improved atomisation achieved with the greater quantity of air.

It has been found experimentally that incorporating the present invention in a fuel injection system for a 1600 cc capacity four cylinder engine and injecting methanol as fuel at a volumetric air-fuel ratio of 50:1 gives a measured spray from an injector nozzle as illustrated in FIG. 1 of 20 microns (Sauter) mean droplet diameter, and with a volumetric air-fuel ratio of 400:1 gives a mean diameter of 5 microns. This is of an order of magnitude finer than existing systems and it will be appreciated that the finer atomisation gives benefits in many ways to an engine's operation.

As an example, the above conditions would allow better cold starting of an engine running on 100% methanol, a capability unmatched by existing injection systems.

In the above description the propelling gas has been referred to as air, however the use of air is not essential for the operation of the invention. In practice it is proposed to use a fuel-air mixture to propel the fuel, the proportions of fuel and air effectively being unimportant. Further details of the use of the fuel-air gas mixture are disclosed in the applicant's U.S. Pat. No. 4,519,356 based on Australian Patent Application No. PF 2126/81 and hereinbefore referred to.

As disclosed in applicant's U.S. Pat. No. 4,554,945, FIG. 6 represents an enlarged sectional view of metering rod 115. The rod is formed from a tubular member 640 having a valve seat insert 641 in the lower end and a spring seat insert 642 in the supper end. The valve element 643 is carried by the valve stem 644 which extends axially through the tubular member 640. The spring 145 is located within the upper end of the tubular member 640 about the stem 644, and co-operates with the second spring seat 646 attached to the end of the stem 644. Diametrically opposite openings 647 are provided in the wall of the tubular member 640 so as to provide a free communication between the air supply chamber 119 and the interior of the tubular member 640 as seen in FIG. 6. The spring element 145 is pre-stressed to normally hold a valve element 143 against the seat 641, and upon the pressure in the air supply chamber 119 reaching a pre-determined pressure, the valve element 143 will be moved clear of the valve seat 641 so that air may pass from the air supply chamber 119 through the tubular member 640 into the metering chamber 120.

Individual solenoid valves may be provided for each metering unit 111 or two or more metering units may be controlled by the same solenoid valve depending upon the number of metering units incorporated in the body 110 and the timing cycle of the cylinders of the engine to which the fuel is being metered. In the current embodiment an individual solenoid valve 150 is provided for each metering unit. The valve element of the solenoid valve 150 is held in position to isolate the air supply duct 151 from conduit 135 when the solenoid is activated, and at the same time the conduit 135 is connected to the vent 155. When the solenoid is de-activated, the pressure of the air in the supply duct 151 will move the valve element into a position so as to isolate the conduit 135 from the vent 155 and couple the air supply duct 151 to the conduit 135. Thus, in this position the compressed air is supplied to the diaphragm cavities 131 and 132. Each of the diaphragm cavities are in constant communication with the air conduit 133 and the conduit 133 is also in constant communication with the air supply chamber 119 by the conduit 135.

The bearings 517 and 518, which slidably support the metering rod 115, are not intended to provide a seal against the leakage of air or fuel from the air supply or metering chambers. Accordingly, the fit between the metering rod 115 and bearings 517 and 518 may be selected so that frictional resistance to the sliding of the metering rod is very low.

The air and fuel leakage is collected in the chamber 116 and is drained therefrom through the conduit 71 into the cavity 472 which communicates with the fuel return nipple 113. The conduit 73 provides communication between the diaphragms 129 and 130, on the side opposite to the cavities 131 and 132, and the chamber 116. This allows drainage of fuel that leaks between the stems of the valves 127 and 128 and their guides, so as to avoid an accumulation of liquid in this area that would prevent correct operation of the diaphragms 129 and 130 to close the valves 127 and 128.

It will be appreciated that the collection of the fuel leakage and the feeding of it to the fuel return nipple and hence returned to the fuel supply. This avoids pollution of the atmosphere by the leaked fuel, and contributes to the overall efficiency of the engine.

Referring now to FIG. 7, the control of the degree of projection of the metering rods 115 into the respective metering chambers 120, is regulated by the actuator 160 slidably supported in the body 110 parallel to the metering rods 15. The actuator rod 160 is connected to each of the metering rods 115 by the cross-head 161. The cross-head 161 is secured in a fixed location on the actuator rod 160 by the set screw 762 and the return spring 763 located about the actuator rod 160 is seated in the recess 764 in the body and abutts the undersurface of the central portion of the cross-head 161. The spring 763 is stressed so as to urge the actuator rod 160 to the cross-head 161, and hence each of the metering rods 115, in an upward direction as viewed in FIGS. 4 and 5, to thereby reduce the degree of projection of the metering rods 115 into the metering chambers 120, and hence increase the quantity of fuel to be delivered during each injection cycle. The diaphragm seal 771 isolates the motor 169 from fuel or fuel vapour that may be present in the 116.

Another aspect of this invention is directed to the metering and delivery of fuel to an internal combustion engine, and in particular concerns those systems, such as previously described, employing a pulse of gas to deliver and/or inject a metered quantity of fuel. The invention has particular applicability to the fueling of engines for vehicles that experience frequent and substantial transient load conditions.

There is an increasing requirement for less expensive, and more fuel efficient, fuel injection systems for internal combustion engines. Conventional fuel injection systems have previously required a high pressure fuel pump, and high differential pressure metering apparatus, in order to achieve an acceptable degree of fuel atomisation and hot fuel handling ability. Both these requirements result in a high cost of componentry due to the high standard of engineering required in production, the close tolerances on manufacturing dimensions, and use of expensive materials of construction.

The use of pneumatic fuel metering was described in the SAE technical paper 820351 by Mackay, and further details may be found in United Kingdom Patent Nos. 2,018,906 and 2,103,501 and U.S. Pat. No. 4,554,945. Such use significantly alleviates the problems described above.

In the methods of pneumatic fuel metering and injection described in the above documents, a metered quantity of fuel located in a chamber is expelled from that chamber by a pulse of gas at high pressure for delivery to the engine. Such delivery is preferably via flexible tubing to the engine's inlet manifold, but may alternatively be delivered directly into the combustion chamber. Existing systems operate by providing gas at an elevated pressure upstream of a valve at the gas inlet port of the chamber, and opening that valve in response to instruction from a programmed electronic controller. The period of valve opening has previously been maintained constant for all metered quantities of fuel to be delivered from the chamber by the gas pulse, the system being designed so the period is sufficient to deliver the required metered quantity of fuel at maximum fuel demand of the engine. The period of valve opening was controlled by a constant width pulse from the electronic controller.

However, for acceptable operation of a given engine, the system must be able to handle a wide range of fuel quantities. Under steady state operation (i.e. constant speed and load) a fuel metering and delivery system requires a turn-down ratio of about 5 to 1, but on abrupt load increases the engine can require, for a very short period, up to twice as much fuel than that at wide open throttle.

Current evidence suggests that although a constant gas pulse width is sufficient to expel the required amount of fuel from the chamber, the quantity of air actually delivered with the metered quantity of fuel significantly decreases with increased metered fuel quantities. This decrease in air quantity is thought to be due to inertia and viscosity effects of the increased quantity of fuel, and has a detrimental effect on the quantity of fuel actually delivered, the quality of the fuel air mixture preparation and spray pattern delivered to the engine.

It is therefore another object of the present invention to provide a method of delivering fuel to an engine by the use of a compressed gas which will give improved engine response in transient load conditions.

The present invention therefore further proposes a method of delivering fuel to an engine by the admission of compressed gas to a chamber to displace a metered quantity of fuel therefrom, and varying the mass of gas admitted with variations in the fuel demand so that as the fuel demand increases the mass of gas increases.

The increasing of the mass of gas admitted to the chamber to displace the metered quantity of fuel, as the quantity of fuel increases, results in additional energy per unit weight of fuel being available to displace the fuel from the metering chamber and transport the fuel to and through the injection nozzle.

Also the increased mass of gas will assist in the atomisation and spray formation of the fuel issuing from the nozzle. Subject to the degree of increase in the gas mass relative to the fuel quantity, the specific energy remaining in the gas at the nozzle may also increase with the increase in fuel quantity, and if not increased should at least be maintained substantially constant for the major part of the range of fuel quantities within normal operating conditions.

The variation of the gas mass may be in accordance with a linear relation to the variation in fuel quantity, or any other selected relation.

The mass of gas delivered to the metering chamber is influenced by the pressure and temperature of the gas at entry to the metering chamber. However, from practical considerations it is not convenient to vary either the pressure or temperature, particularly having regard to the requirement of effecting the variation in a time interval of a few milliseconds. The most convenient means of varying the mass of gas is to vary the time period during which the gas is admitted to the metering chamber.

More specifically there is provided a method of delivering fuel to an engine comprising establishing a metered quantity of fuel in a chamber, said chamber having a gas supply port and a fuel delivery port, and displacing the fuel from said chamber through said fuel delivery port and delivering the fuel through a nozzle to the engine, said displacement and delivery of the fuel being effected by admission of gas to the chamber through said gas supply port, wherein the mass of gas admitted is varied in accordance with the fuel demand of said engine.

As is known, when a fluid and particularly a liquid flows through a conduit a layer of the liquid is formed on the internal surface of the conduit. The thickness of the layer is dependent on a number of factors including the viscosity of the liquid, the velocity of flow, and the surface finish of the conduit. As the velocity of the liquid decreases the thickness of the layer increases, and thus in the fuel metering systems of the type under consideration, if the velocity of the fuel delivery decreases the quantity of fuel in the stationary layer increases.

It is therefore seen that if there is an increase in the fuel quantity without a corresponding increase in the gas mass propelling the fuel, a portion of the increase in fuel quantity may not be delivered to the engine, but is consumed in increasing the stationary layer. Accordingly, by increasing the mass of air propelling the fuel as the fuel quantity is increased, a decrease in fuel velocity may be avoided and the thickness of the stationary layer remains substantially constant.

It is possible to reduce the thickness of the layer if the increase in the air mass is sufficient to increase the velocity of the fuel. This can be beneficial in two ways. Increasing the gas mass without an increase in the metered quantity of fuel will increase the fuel velocity and consequently reduce the layer thickness. In this way a limited increase in fuel quantity delivered to the nozzle can be achieved without changing the actual metered quantity. This manner of increasing fuel supply to the engine can be useful where the fuel demand increase is relatively small and of short duration.

Secondly, if the increase in the gas mass is associated with an increase in metered quantity of fuel, and is sufficient to increase the overall fuel velocity, then a reduction of the fuel layer thickness may result, thus further increasing the quantity of fuel delivered through the nozzle. This may be used to advantage when there is a large or rapid increase in the fuel demand.

The quantity of fuel may be metered upon introduction to the chamber, or may be metered by and/or during the course of the admission of gas to the chamber.

This further aspect of the invention is more readily understood from the following description with reference to FIGS. 8 to 11 of the accompanying drawings. In the drawings.

Figure 7:
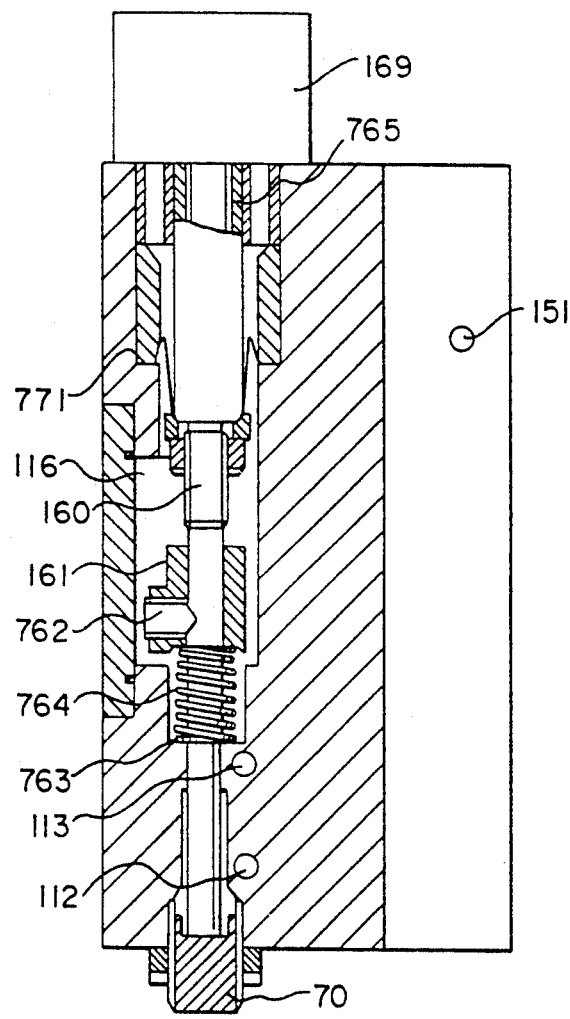
Figure 6:
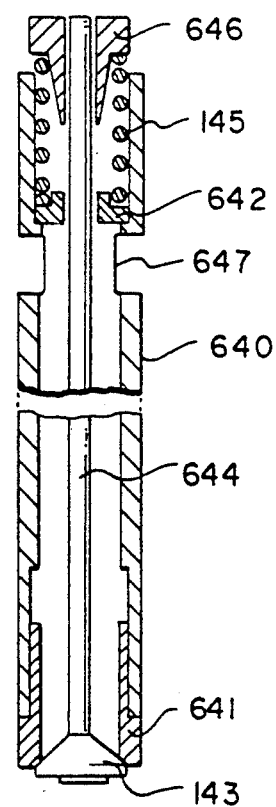
Figure 8:
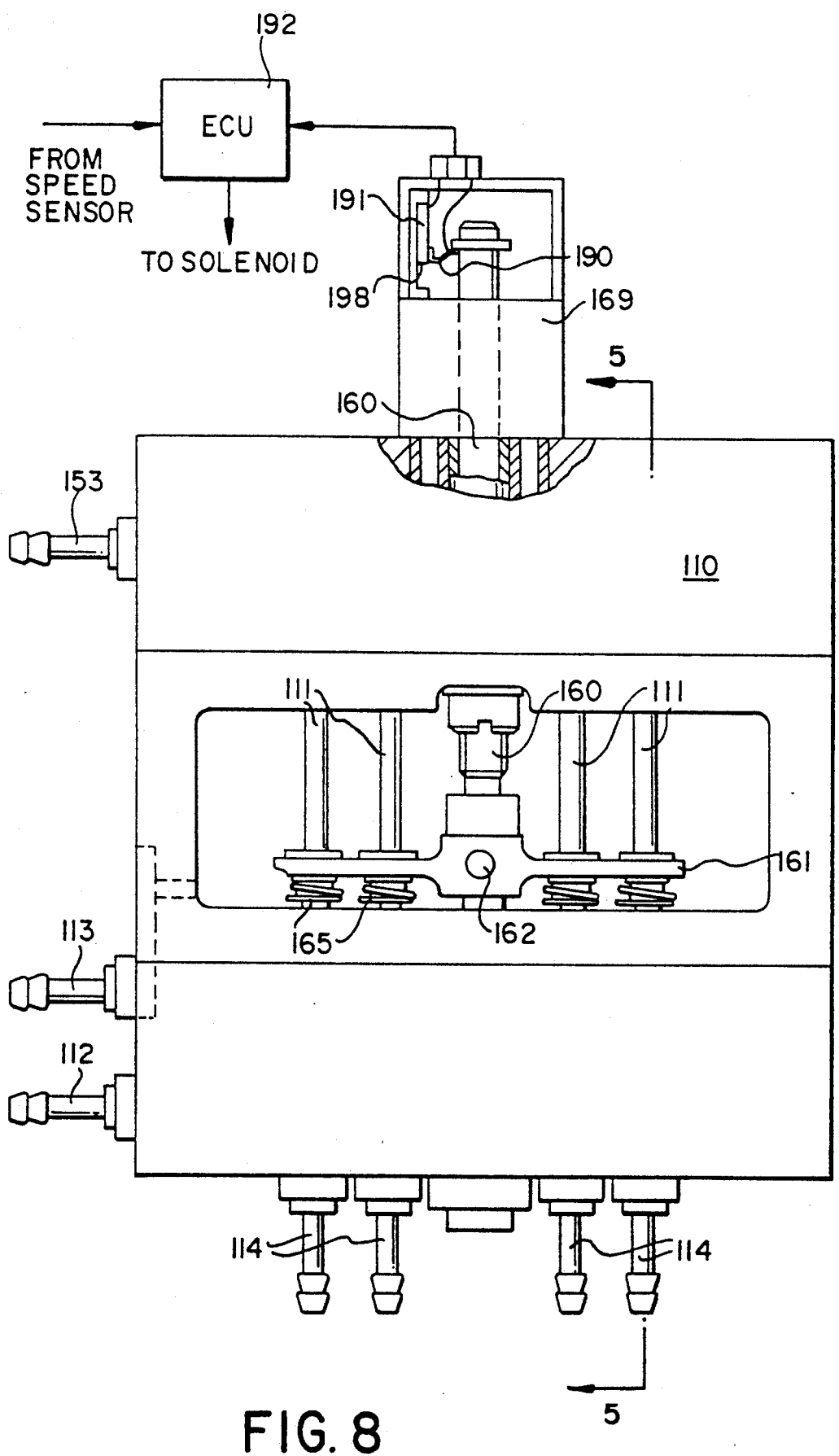
FIG. 8 shows a fuel metering apparatus similar to that shown in FIG. 4 but for supplying a four cylinder engine.

With respect to FIG. 8, the metering apparatus shown has common constructional features and components with the apparatus shown in FIGS. 4 to 7 and the same reference numbers are used for these common features and components. Refer now to FIG. 8 comprises a body 110, having incorporated therein four individual metering units 111 arranged in side by side relationship. This apparatus is thus suitable for use with a four cylinder engine, with each metering unit 111 dedicated to a separate cylinder. The nipples 112 and 113 are adapted for connection to a fuel supply line and a fuel return line respectively (not shown), and communicate with respective fuel supply and return galleries 60 and 70 provided within the body 110 for the supply and return of fuel from each of the metering units 111.

Each metering unit 111 is provided with an individual fuel delivery nipple 114 to which is connected a respective metered fuel delivery conduit 108 which conducts the individually metered quantities of fuel to an injector nozzle 18. The nozzle is located at a suitable position to deliver the fuel to the engine, such as inserted in the inlet manifold of the engine near the respective cylinder air inlet valve. Further details of the apparatus are given in our abovementioned U.S. patent application No. 4,554,945.

The body 110 is preferably positioned close to the injector nozzle 18, and the metered fuel delivery conduits 108 are suitable tubing of approximately 1.8 mm diameter, and from 10 to 40 cm in length varying with the distance to each cylinder.

Figure 1:
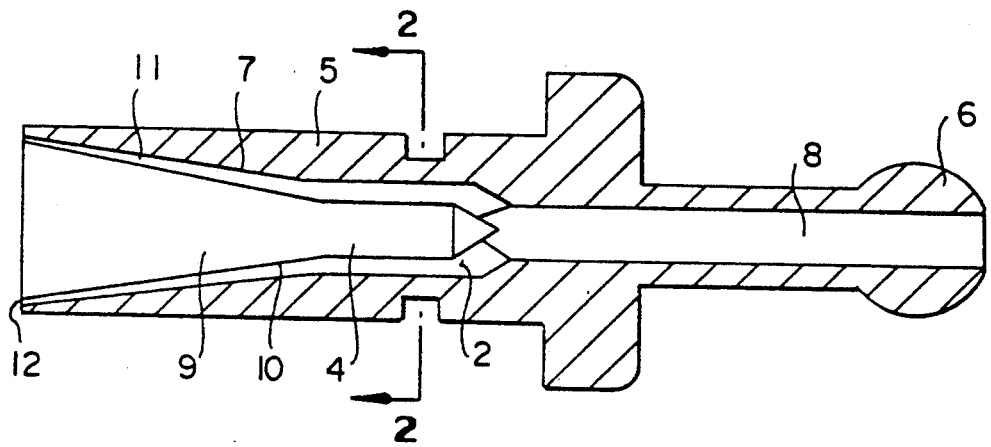
Figure 2:
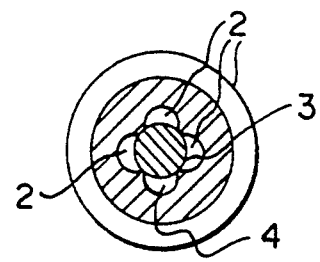
Figure 3:
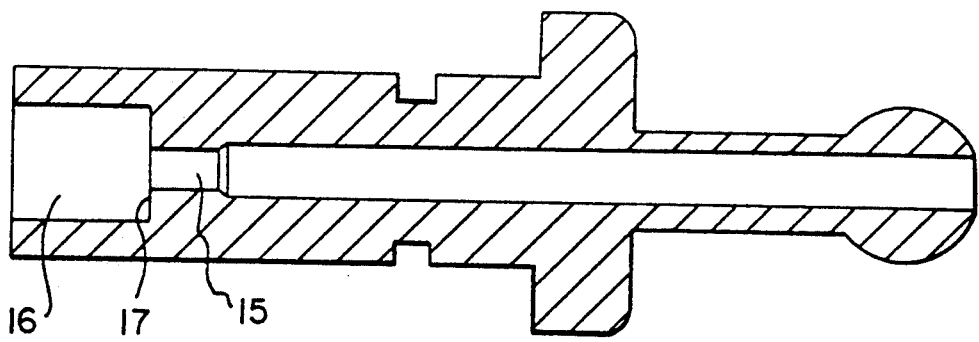
Figure 4:
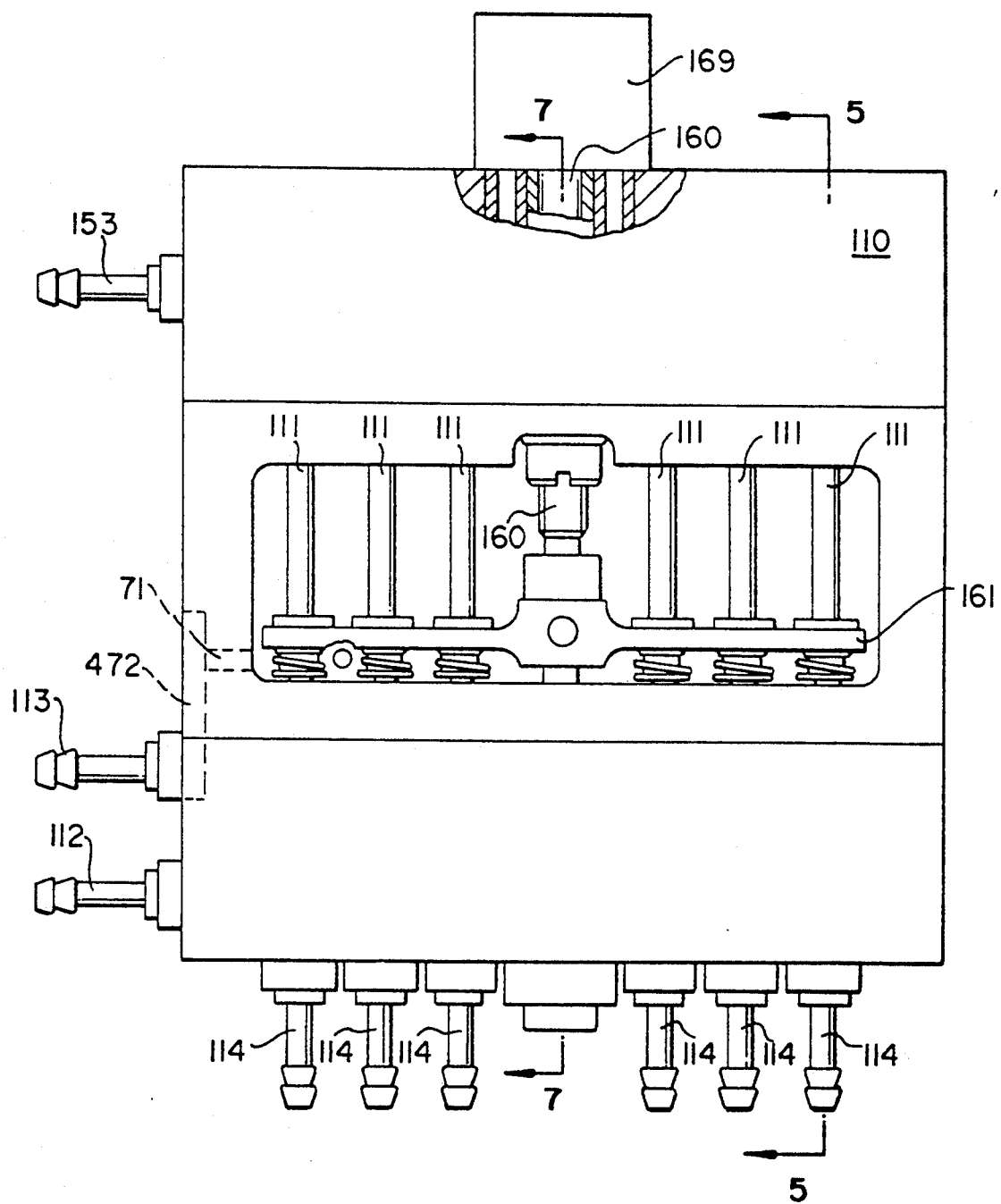
Figure 5:
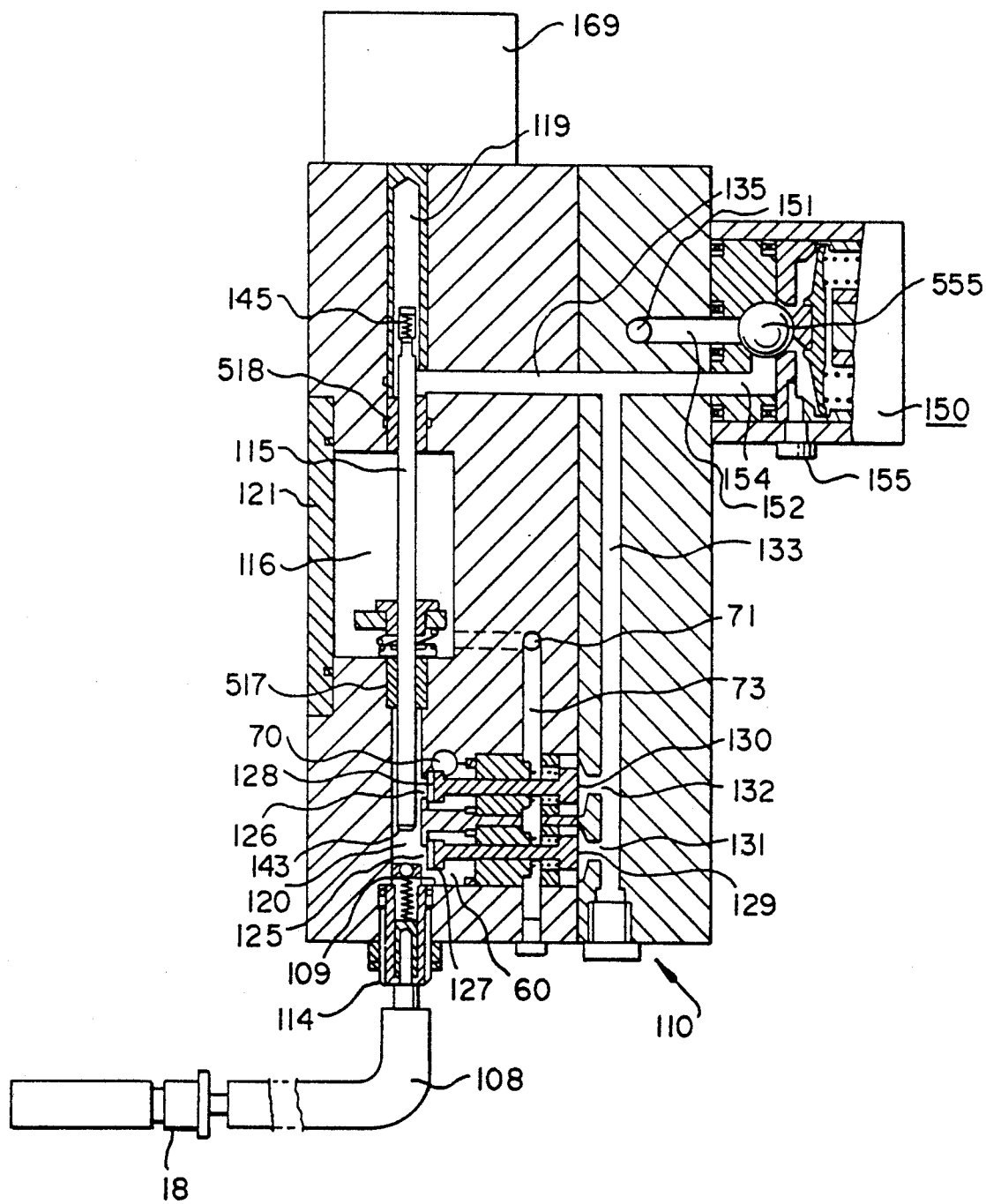

FIG. 5 shows in section one metering unit 111, having a metering rod 115 extending into both the air supply chamber 119 and metering chamber 120. Each of the four metering rods 115 pass through the common leakage collection chamber 116, which is formed by a cavity provided in the body 110 and the coverplate 121 attached in sealed relation to the body 110. The function and operation of the leakage collection chamber 116 is no part of this invention and is described in greater detail in the abovementioned U.S. Pat. No. 4,554,945.

Each metering rod 115 is hollow, and is axially slidable in the body 110, the extent of projection of the metering rod into the metering chamber 120 being varied to adjust the quantity of fuel displacable from the metering chamber 120. The valve 143, at that end of the metering rod located in the metering chamber 120, is supported by the rod 143a and normally held closed by the spring 145, located between the upper end of the hollow rod 115 and valve rod 143a. The flow of air through the hollow bore of the metering rod 115 from the air supply chamber 119 to the metering chamber 120 is controlled by the valve 143. Upon the pressure in the air supply chamber 119 rising to a predetermined value the valve 143 is opened to permit air to flow from the air supply chamber 119 to the metering chamber 120 through hollow rod 115, to displace the fuel from the metering chamber 120.

The quantity of fuel displaced by the air is that fuel located in the metering chamber 120 between the point of entry of the air to the metering chamber, and the point of discharge of fuel between the air admission valve 143 and the delivery valve 109 at the opposite end of the metering chamber 120.

Each of the metering rods 115 are coupled to the crosshead 161, as shown in more detail in FIG. 7, and the crosshead is coupled to the actuator rod 160 which is slidably supported in the body 110. The actuator rod 160 is coupled to the motor 169, which is controlled in response to the engine fuel demand, to adjust the extent of projection of the metering rods 115 into the metering chambers 120, and hence the position of the air admission valves 143 so, the metered quantity of fuel delivered by the admission of the air is in accordance with the fuel demand. The motor 169 may be a reversible linear type stepper motor such as the 92100 series marketed by Airpax Corp.

The fuel delivery valves 109 are each pressure actuated to open in response to the pressure in the metering chamber 120, when the air is admitted thereto from the air supply chamber 119. Upon the air entering the metering chamber 120 through the valve 143, the delivery valve 109 also opens, and the air will move towards the delivery valve displacing fuel from the metering chamber through the delivery valve. The air admission valve 143 is maintained open until sufficient air has been supplied to displace the fuel between the valve 143 and 109 from the chamber, and to provide additional air to transfer the fuel through the conduit 108 to the nozzle 18, and to atomisation the fuel as it is delivered through the nozzle.

Each metering chamber 120 has a respective fuel inlet port 125 and a fuel outlet port 126 controlled by respective valves 127 and 128 to permit circulation of fuel from the inlet gallery 60, through the metering chamber 120, to the outlet gallery 70. Each of the valves 127 and 128 are connected to the respective diaphragms 129 and 130. The valves 127 and 128 are spring-loaded to an open position, and are closed in response to the application of air under pressure to the respective diaphragms 129 and 130 via the diaphragm cavities 131 and 132. Each of the diaphragm cavities are in constant communication with the air conduit 133, and the conduit 133 is in constant communication with the air supply chamber 119 by the conduit 135.

Thus, when air under pressure is admitted to the air supply chamber 119 and hence to the metering chamber 120 to effect delivery of fuel, the air also acts on the diaphragms 129 and 130 to cause the valves 127 and 128 to close the fuel inlet and outlet ports 125 and 126.

The control of the supply of air to the chamber 119 through conduit 135, and to the diaphragm cavities 131 and 132 through conduit 133, is regulated in time relation with the cycling of the engine by the solenoid operated valve 150. The common air supply conduit 151, connectable to a compressed air supply via nipple 153, runs through the body 110 with respective branches 152 providing air to the respective solenoid valve 150 of each metering unit 111.

Normally the spherical valve element 159 is positioned, under action from springs 170, to prevent the flow of air from conduit 151 to conduit 135, and to vent conduit 135 to atmospheric via vent port 161. When the solenoid is energised the force of the spring 170 acting on the valve element 159 is relieved, and the valve element is displaced by the pressure on the air supply to permit air to flow from conduit 151 to conduits 135 and 133.

The timing of the energizing of the solenoid 150 in relation to the engine cycle may be controlled by a suitable sensing device activated by a rotating component of the engine, such as the crankshaft or flywheel or any other component driven at a speed directly related to engine speed. A sensor suitable for this purpose is an optical switch including an infra-red source and a photo detector with Schmitt trigger.

Previously it has been proposed that the duration of energization of the solenoid 150 be a fixed period, independent of fuel quantity to be delivered and engine speed. This fixed period was selected to suit the maximum fuel demand when the engine is operating at maximum engine speed.

The most convenient manner of controlling the operation of the solenoid 150 is an electronic controller, which provides a pulse of electrical energy of fixed duration to the solenoid irrespective of the engine fueling requirements. However, in using that form control in practice, it has been found that the actual quantity of air passed with the fuel through the injector nozzle 18 per fuel delivery tends to reduce with increasing fuel delivery levels.

This is believed to be due to changes in inertia and viscosity effects arising with the increased fuel level. This can be compensated for by the present invention by increasing the length of time the electrical energy is applied to the solenoid 150 at the higher fuelling levels, thus increasing the time during which gas enters the metering chamber 120 and so increasing the mass of air available to pass along the fuel conduit and through the delivery nozzle.

Figure 9:
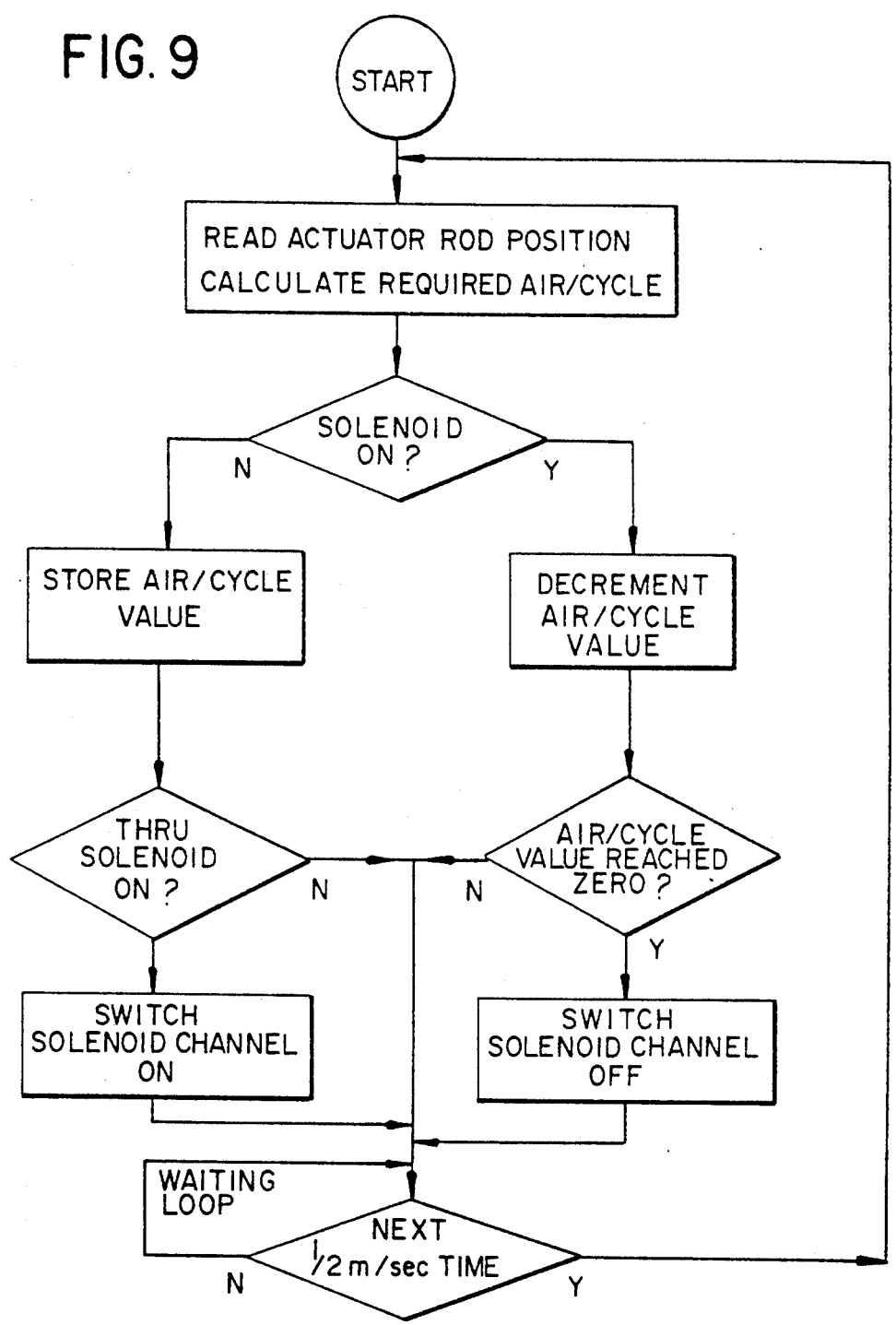
FIG. 9 is a logic diagram of the operation of an electronic controller to regulate the mass of gas available to deliver the fuel.
Figure 10:
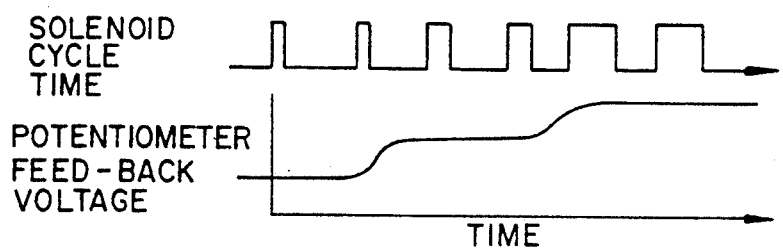
FIG. 10 is a diagram illustrating the variation in the period of gas admission with fuel demand.

FIG. 9 is a logic diagram representing a typical mode of operation of the electronic controller 192 (FIG. 8) to effect variation of the period that the solenoid 150 is energised in proportion to the metered quantity of fuel to be delivered to meet the engine fuel demand. The controller 192 is programmed with the required relationship between metered fuel quantity and air mass per injection cycle.

As shown in FIG. 8 the actuator rod 160 carries a wiper arm 190 which co-operates with a stationary resistance strip 191 mounted in the body 110. The wiper and resistance strip forming a feed back potentiometer 198. The actuator rod 160 is coupled to the metering rods 111 and varies the extent of projection of the metering rods into the metering chambers 120, and hence varies the metered quantity of fuel delivered. Accordingly, the position of the wiper arm 190 on the resistance strip 191 and hence the output of the feed-back potentiometer is directly proportional to the metered quantity of fuel being delivered.

The electronic controller 192 is programmed to receive at a regular interval of voltage reading from the potentiometer 198 and thereby determine the position of the actuator rod 160 and hence the size of the metered quantity of fuel. The readings from the resistor are conveniently made at half milli-second intervals.

Referring still to FIG. 9, having received the voltage reading from the potentiometer the controller 192 determines the period of energization of the solenoid 150 required for the metered quantity of fuel corresponding to the position of the actuator rod 160. If at the time of the controller making the determination the engine is in that part of the engine cycle when fuel is being delivered, then the controller will make an adjustment to the remaining period of energization. If as a result of this adjustment the period of energization is reduced to zero, then the controller will switch off the solenoid energizing channel so that delivery of fuel and gas will cease. However, if the remaining period is not reduced to zero then the solenoid will continue to be energized and fuel and gas will continue to be delivered. At the next half milli-second period the sequence is repeated.

Reverting to the determination of the period of energizing of the solenoid, if at that time the engine is not in that part of its cycle when fuel is to be delivered, the newly determined period of energization is stored. If within the then current half milli-second interval the engine enters the part of its cycle when fuel is to be delivered, then the solenoid will be energized for the newly determined period. In the event that the engine does not enter the part of its cycle for the delivery of fuel during the half milli-second interval, then at the end of that period the sequence is repeated as above explained.

Commercially available componentry can be arranged and programmed to perform the functions required to fulfill the above discussed logic diagram. Also other factors may be introduced to vary the period that the solenoid is energized. In automotive applications one factor that may be taken into account is the voltage of the electrical energy source to operate the solenoid.

The voltage of the battery provided in an automobile may vary significantly under operating conditions from the nominal rated 12 volts. Significant drop in voltage can occur at times when high loads are applied to the battery, such as cranking the engine during start-up. In order to compensate for this drop in voltage available to energize the solenoid, the period of energization may be extended.

The electronic controller 192 may thus incorporate a function to compare the actual voltage available to the solenoid against the battery rated voltage and if the actual voltage is below rated, an extension of the period of energization of the solenoid may be made. The degree of extension of the period relative to the drop in voltage may be pre-programmed into the electronic controller.

The period of energization of the solenoid may be expressed by the formula $$PW_e = PW_o + PW_{bv} + PW_{ACT}$$

Where
$PW_e$ is actual period of energization
$PW_o$ is a basic period of energization
$PW_{bv}$ is battery voltage compensation period
$PW_{ACT}$ is actuator rod position compensation period Typically $PW_o$ is the period of energization at noload on the engine and may be of the order of 12 to 15 milli-seconds, and the maximum increase in response to the actuation rod position may be 5 to 10 milli-seconds, the increase being linear over the range of movement of the actuator rod. The increase in energization period for decline in battery voltage may be of the order of 0.5 milli-seconds per volt. The increase of 5 to 10 milli-seconds for actuation rod position is for full fuelling under transient load condition and is considerably greater (of the order of 50%) than that required under full-open-throttle steady conditions. The total time per cycle that the solenoid may be energised is of course limited by the cycle time of the engine and the time required to fill the metering chamber with fuel, the latter being of the order of 8 milli-seconds.

It is desirable from combustion efficiency consideration for injection of the fuel to terminate at a fixed point in the engine cycle. Accordingly, when the period of energization of the solenoid is varied the termination point of the energization remains fixed and the additional time is obtained by advancing the initiation point of the energization. FIG. 11 of the drawings shows a typical variation in the duration of application of the air to the fuel being delivered in relation to the output of the potentiometer that is directly related to the quantity of fuel being delivered.

In the preceding description the period of energization of the solenoid has made the variable in response to variations in metered quantities of fuel. However, it is to be understood that the purpose in varying that period is to achieve a corresponding variation in the mass of air available to effect the delivery of the metered quantity of fuel. As the pressure of the air supply is maintained constant by suitable pressure regulators, and in practical terms temperature variations normally encountered do not significantly influence the density of the air, the mass of air delivered to the metering chamber is directly related to the period that the air is available via the solenoid valve 150.

When the engine is under transient conditions, requiring a rapid increase in fuelling, it can be difficult to control a fuel metering and injection system to deliver the optimum amount of fuel. From commencement of a transient the first one or two cycles of each cylinder should preferably have a higher fuel loading than when operating at the same throttle opening for steady state operation. This immediate enrichment of the fuel mixture is required to give the engine an acceptable rapid response when the throttle is suddenly opened. It has now been found that an acceptable transient response can be obtained from an engine utilizing the fuel metering system described above by increasing the mass of the air available to deliver the fuel that is not dependent on any increase in the metered quantity of fuel.

During operation of an engine, the internal surfaces of the fuel delivery path, comprising delivery conduit 108 and associated injector nozzle 18, remain wetted by the fuel after each delivery of fuel and air through the nozzle 18 to the engine. During substantially smooth engine operation (i.e. steady state or light acceleration or deceleration) this residual wetting of the internal surfaces has no significant effect on the operation of the engine, as the amount of fuel retained by lthe wet surfaces remains substantially constant while the amount of air used for each delivery is constant.

Figure 11A:
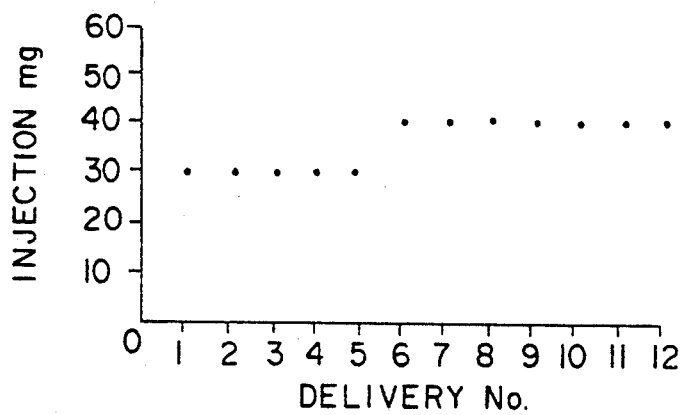
FIGS. 11a to 11d illustrate variations to fuel quantity delivered in relation to gas mass.
Figure 11B:
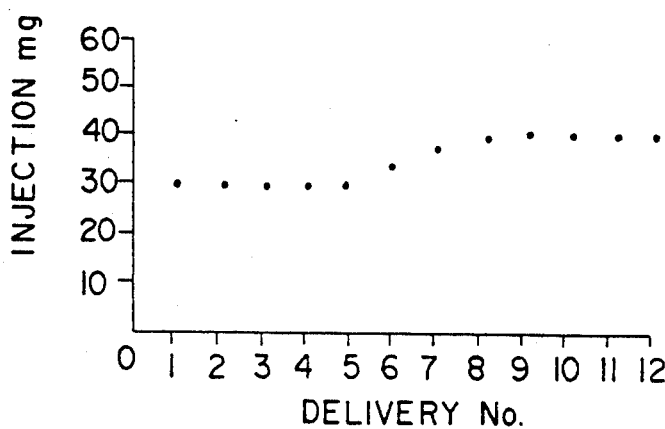

FIG. 11*a* illustrates the desired sequential fuel deliveries from the nozzle 18, for an engine transient requiring an immediate increase in fuel rate between deliveries 5 and 6. FIG. 11*b* shows typical delivered fuel quantities where the fuel metering and injection system is arranged so that each of the twelve deliveries of fuel are propelled by the same mass of air. The degree of residual wetting of delivery line 108 is increased for increased metered quantities of fuel, and the amount of fuel delivered from the injector nozzle is seen to increase gradually between deliveries 5 and 9. From the first delivery at the new fuel metering rate, the amount of fuel delivered from nozzle 18 would be less than the metered quantity determined at the position of the metering rod 115 in the metering chamber 120, because the mass of air available cannot immediately handle the increased quantity of fuel, and there is an increase in the residual wetness on the internal surfaces. However, the amount of fuel retained wetting delivery line 108 is a function both of the quantity of fuel metered at the metering chamber, and of the mass of the air used to deliver the metered fuel along the conduit and out of the nozzle.

Figure 11C:

Consider now FIG. 11*c* where each delivery is derived from the same metered quantity of fuel being in the metering chamber 120. However, the mass of air for delivery 6 has been made larger than the others, by energizing the solenoid for a longer period. Delivery 6 ejects more fuel from the nozzle 18 than delivery 5, as it has reduced the quantity of fuel wetting the inner surfaces of delivery line 108. Further, delivery 7 passes correspondingly less fuel than delivery 5 as some fuel will be left in the delivery line 108 rewetting the surfaces. Subsequently delivery using the normal mass of air will deliver an amount of fuel from the nozzle corresponding to the metered quantity available in the metering chamber 120.

Figure 11D:
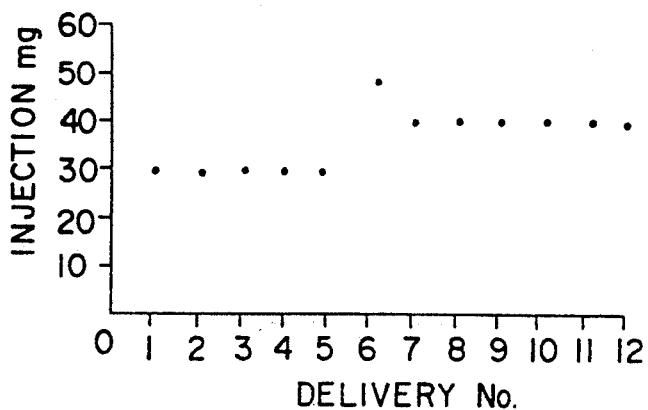

Referring now to FIG. 11*d* this illustrates a repeat of the engine transient conditions of FIG. 5*a* except the system is now arranged so that the increased amount of fuel is propelled by an increased mass of air. Delivery 6, being the first delivery at the increased metered quantity of fuel and mass of air, will leave the delivery line 108 slightly less wet than the preceding delivery 5, while following pulses 7-8-9 etc., will maintain that reduced degree of wetting. The effect on delivered fuel quantities can be seen in FIG. 11*d*. The transient fuel enrichment is evident. It will be appreciated that this arrangement provides also the desirable fuel enleanment on deceleration transients due to the delivery line 108 entering a stage of increased residual wetting.

The use of the capability of reducing the wetness of the internal surface of the fuel delivery conduit is preferably in combination with the increase in metered quantity of fuel as represented by FIG. 11*d* particularly when the engine is experiencing a severe transient condition. However, either capability may be used individually. The electronic controller 192 may be arranged to respond to a transient condition sensed by a factor other than the actuator rod position in order to implement operation of the wetness reduction capability, such as by sensing the rate of change of the throttle position.

It will however be appreciated that the invention described herein is not restricted to the particular apparatus described in detail above, but is applicable to all fuel metering and/or delivery systems utilizing a pulse of gas to propel a metered quantity of fuel for delivery to an engine.

The metered quantity of fuel will depend on engine load, transient state, engine cylinder size, and selected operating air/fuel ratio, and may typically range from a few milligrams up to say 100 milligrams (or more) per injection. Correspondingly, the preferred mass of air delivered to the metering chamber per injection may vary over the range 2 milligrams to 10 (or more) milligrams per injection. An approximate volumetric ratio of air to fuel measured at S.T.P. is 50:1. Air supply pressures are regulated but metering operation may be achieved typically using supply pressures over the range 200 kPa to 1000 kPa (or even higher). Practically, the minimum pressure is determined by the need to operate valves, and to supply sufficient air mass, so that 400 kPa is a more usual value. Similarly, maximum pressures tend to be determined according to the need for simple and efficient supply sources. In an automotive application a single stage compressor would be desired, effectively limiting maximum pressures to around 800 kPa.

Under some engine operating conditions it may be desirable to increase the mass of air per injection even though there is no corresponding increase in fuel quantity. One such condition may be during start-up of the engine particularly under cold start conditions. The additional air will contribute to improved atomization, particularly when the engine is cold and vaporization is not assisted by the heat of the engine.

The engine condition in response to which the mass of air is varied may be timed from start-up so the air mass decreases as the time after start-up increases until the air mass falls to a predetermined limit. If the engine condition is temperature, again the air mass will decrease as the temperature increases until a predetermined limit is reached.

We claim:

1. A method of delivering liquid fuel to an internal combustion engine comprising the steps of:

delivering individual metered quantities of liquid fuel into a conduit communicating with a fixed size constantly open nozzle;

admitting an individual quantity of gas to said conduit immediately upstream of each metered quantity of fuel at a pressure and for a period sufficient to propel the preceding metered quantity of fuel to and discharge the fuel through said nozzle to the engine as an independent fuel pulse, said quantity of fuel in said fuel pulse being independent of the period of admission of gas.

2. A method of delivering pulses of metered quantities of liquid fuel to an internal combustion engine, comprising the steps of:

filling a chamber with fuel, the chamber having a selectively openable discharge port in communication therewith and with a conduit terminating in a fixed size constantly open nozzle;

admitting gas to said chamber to displace a fuel pulse from the chamber upon opening of the discharge port;

continuing the supply of gas to the chamber at a pressure to propel the fuel along the conduit and discharge the fuel through the nozzle; and controlling the quantity of fuel displaceable by the admission of said gas to the chamber, said quantity of fuel in said fuel pulse being independent of the period of admission of gas.

3. A method as claimed in any one of claims 1 or 2 wherein the pressure of gas admitted to the conduit is selected so the fuel issues from the nozzle at a speed of the order of sonic speed.

4. A method as claimed in any one of claims 1 or 2 wherein at least part of the fuel forms an emulsion with the gas during passage through the conduit.

5. A method as claimed in claim 4 wherein the friction drag between the fuel and the internal surface of the conduit, and the speed of the gas in the conduit, are selected so that at least a portion of the fuel is broken up into droplets to form the emulsion.

6. A method according to claim 2 wherein the control of the quantity of fuel displaced is effected by adjusting the relative positions of entry of the gas to and of the discharge of the fuel from said chamber, whereby the fuel capacity of the chamber between said positions is varied.

7. A method according to claim 6 wherein the position of entry of said gas to the chamber is moved relative to the position of discharge of fuel from said chamber.

8. Apparatus for delivering pulses of liquid fuel to an internal combustion engine comprising:

a conduit, a fixed size constantly open nozzle in communication with said conduit, fuel means for delivering an individually metered quantity of fuel into the conduit, and gas means for admitting an individual quantity of gas to the conduit upstream of the fuel at a pressure and for a period sufficient to propel the fuel through said conduit and discharge the fuel from said nozzle as an independent pulse, said quantity of fuel in said pulse being independent of the period of admission of gas.

9. Apparatus as claimed in claim 8 including means for supplying the gas at a pressure such that the fuel has a speed of the order of sonic speed as it issues from the nozzle.

10. Apparatus as claimed in claim 8 or 9 wherein the nozzle has a delivery orifice and a passage leading to the orifice and said passage decreases in cross-section from an end remote from the orifice to an end at the orifice.

11. Apparatus as claimed in claim 10 wherein the orifice is of annular shape, the passage is of annular shape having inner and outer surfaces, and at least one of said surfaces being of a conical or frusto-conical form.

12. Apparatus as claimed in claim 11 wherein the inner surface of the passage diverges outwardly towards the delivery orifice.

13. Apparatus as claimed in claim 11 wherein the outer surface of the passage diverges outwardly towards the delivery orifice.

14. Apparatus as claimed in claim 8 including:

a body having a chamber formed therein;

a fuel discharge port selectively openable to the chamber;

a gas inlet port selectively openable to the chamber to admit gas to the chamber;

said conduit communicates said discharge port with said fixed size constantly open nozzle;

whereby, on admission of gas to the chamber and opening of said discharge port, fuel in the chamber is displaced from the chamber, propelled along the conduit and discharged through the nozzle by the gas; and means for controlling the quantity of fuel displaceable from the chamber by the admission of the gas.

15. Apparatus as claimed in claim 14 wherein the means for controlling the quantity of fuel displaceable from the chamber comprises means to adjust the relative positions of entry of the gas to and of discharge of the fuel from the chamber.

16. Apparatus as claimed in claim 15 wherein said means adjusts the position of the gas inlet port.

17. Apparatus according to claim 15 or 16 including a movable member extending into the chamber and movable relative to the chamber, the gas inlet port being formed in said movable member.

* * * * *